Jan. 22, 1929.  
E. LYNDON  
1,699,850  
STORAGE BATTERY CONTAINER  
Filed Jan. 21, 1926

Inventor  
Edward Lyndon.  
By his Attorney  
Alexander Chessin

Patented Jan. 22, 1929.

1,699,850

UNITED STATES PATENT OFFICE.

EDWARD LYNDON, OF NEW YORK, N. Y.

STORAGE-BATTERY CONTAINER.

Application filed January 21, 1926. Serial No. 82,732.

My invention relates to containers for electric storage batteries and, more particularly, for storage batteries known as lead batteries, i. e. batteries comprising elements made of lead oxide immersed in dilute sulphuric acid.

The containers here considered are those made of an acid non-resisting material, such, for instance, as wood, coated with a protective layer of an acid-resisting material.

In such batteries, the plates are often prevented from making contact with the inner surface of the container by interposing ribs or protective strips between the inner surface of the container walls and the battery plates. My invention is concerned with these ribs or strips.

In an application for patent Serial No. 82730, filed simultaneously herewith, I have shown a container made of pressed wood pulp or other acid non-resisting material covered with a coating of an impervious, acid-resisting substance which penetrates below the surface of the acid non-resisting material. In that other application, I have also shown a form of container having the protective strips, preferably incorporated in the walls of the container. For instance, when the material used is pressed wood pulp, the container is pressed out with the strips projecting therefrom, all in one piece. The coating of the acid-resisting substance is then applied to the container, covering also the protective strips.

When the battery is used in transportation, it is desirable to provide additional protection for all portions of the container which are in contact with the battery plates, because, owing to knocks and vibration during transportation, the protective acid-resisting coating is apt to break.

In still another application for patent Serial No. 82731, filed simultaneously herewith, I have shown means for protecting the supporting bridges on which the battery plates rest. Similar means applied to the protective strips form the subject matter of the present invention.

Figure 1:
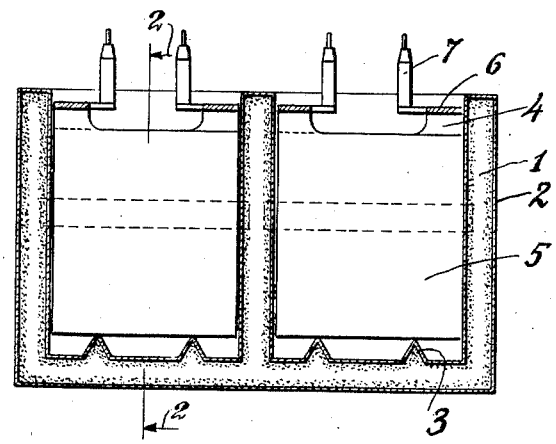
Figure 2:
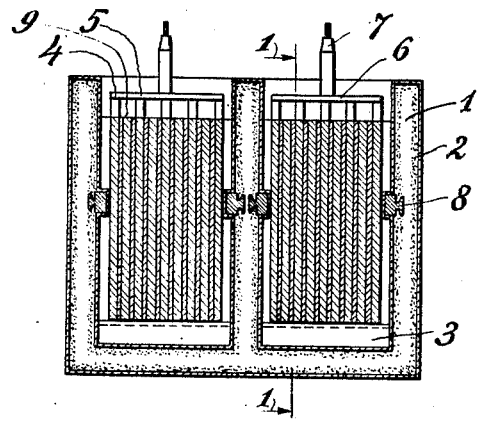
Figure 3:
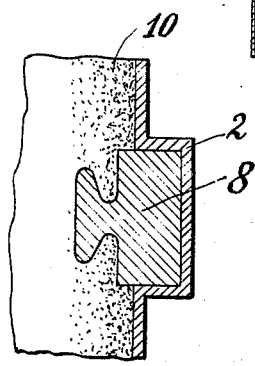

Referring to the drawing, Figure 1 is a vertical cross section of my container, Figure 2 is a vertical cross section thereof taken along the line 2—2 of Figure 1, and Figure 3 is a detail of the protective strip.

In these figures, 1 is my battery container, 2 is an acid-resisting coating, 3 is a supporting bridge for the battery plates, 4 and 5 are negative and positive plates, respectively, 6 is a plate connecting strip, 7 a terminal post, 8 a protective strip made of a tough acid-resisting material imbedded in the walls of the container, and 9 a plate separator. In the detail Figure 3, the penetration of the acid-resisting substance below the surface of the acid non-resisting material of the container is designated by the numeral 10.

After the container is made, with the protective strips in place, its entire surface, inside and outside, is covered with the acid-resisting substance which is made to penetrate below the surface of the acid non-resisting material. For the latter purpose, I prefer to use an easily permeable material, such as, for instance, pressed wood pulp. When the permeability of the material is low, I may force the acid-resisting substance below the surface of the acid non-resisting material by means of, for instance, a vacuum pump.

I have found hard rubber well suited as the tough acid non-resisting material, and vulcolac excellently well adapted as the here described acid-resisting substance for the penetrating coating. Vulcolac is a solution of hard rubber in solvent naphtha. Such a compound is described in the British Patent No. 243,966/1925. It has great power of penetration and is not only acid proof, when allowed to set and harden, but resists the action of the gases developed in a battery during charges and discharges.

Even should the coating break where the plates are in contact with the walls of the container, owing to jars and vibration, i. e. along the protective strips 8, the tough acid resisting material of these inserted strips will effectively prevent the passage of any acid into the acid non-resisting material of the container.

I claim:

1. In a battery container made of an acid non-resisting material, protective strips of a tough acid-resisting material on the inner walls thereof, said container, including said protective strips, being covered with an acid and gas resisting substance, containing prevulcanized rubber.

2. In a battery container, made of an acid non-resisting material, protective strips of a tough acid-resisting material imbedded in the inner walls thereof, said container, including said protective strips, being covered with an acid-resisting substance.

3. In a battery container made of permeable acid non-resisting material, protective strips made of a tough acid resisting material imbedded in the inner walls thereof, said container, including said protective strips, being covered with an impervious acid-resisting substance penetrating below the surface of said acid non-resisting material.

4. In a battery container made of pressed wood pulp, protective strips of a tough acid-resisting material imbedded in said wood pulp along the inner surface of said container, said container, including said protective strips, being covered with an impervious acid-resisting substance penetrating below the surface of said wood pulp.

5. In a battery container made of pressed wood pulp, protective strips of a tough acid-resisting material imbedded in the inner walls thereof, said container, including said protective strips, being covered with a coating comprising hard rubber.

6. In a battery container made of wood pulp, protective strips of a tough acid resisting material on the inner walls thereof, said container, including said protective strips, being covered with a coating of pre-vulcanized rubber penetrating below the surface of said wood pulp.

EDWARD LYNDON.